(12) United States Patent
Kim

(10) Patent No.: US 11,959,294 B2
(45) Date of Patent: Apr. 16, 2024

(54) MULTI-PURPOSE BOLT UNIT FOR FIXING OBJECT TO DRILLED HOLE OF SOFT CONSTRUCTION STRUCTURE

(71) Applicants:4A SYSTEMS CO., LTD., Incheon (KR); Sojoong Kim, Incheon (KR)

(72) Inventor: Sojoong Kim, Incheon (KR)

(73) Assignees: 4A SYSTEMS CO., LTD., Incheon (KR); Sojoong Kim, Incheon (KR)

( * ) Notice: Subject to any disclaimer, the term of this patent is extended or adjusted under 35 U.S.C. 154(b) by 0 days.

(21) Appl. No.: 18/455,579

(22) Filed: Aug. 24, 2023

(65) Prior Publication Data
US 2024/0068259 A1 Feb. 29, 2024

(30) Foreign Application Priority Data

Aug. 25, 2022 (KR) .................. 10-2022-0106624

(51) Int. Cl.
*E04H 12/00* (2006.01)
*E04H 12/22* (2006.01)
*E04H 12/34* (2006.01)

(52) U.S. Cl.
CPC ..... *E04H 12/2223* (2013.01); *E04H 12/2269* (2013.01); *E04H 12/2292* (2013.01); *E04H 12/347* (2013.01)

(58) Field of Classification Search
None
See application file for complete search history.

(56) References Cited

U.S. PATENT DOCUMENTS 4,211,049 A * 7/1980 Fischer ............... F16B 13/141
52/704
5,490,365 A * 2/1996 Roth ................... F16B 11/006
52/707

(Continued)

FOREIGN PATENT DOCUMENTS

DE 102019128030 B3 * 10/2020 ............. B21D 22/16
GB 2366306 A * 3/2002 ......... E04H 12/2223

(Continued)

OTHER PUBLICATIONS

"Office Action of Korea Counterpart Application", dated Jan. 19, 2023, with English translation thereof, p. 1-p. 10.

(Continued)

*Primary Examiner* — Steven M Marsh
(74) *Attorney, Agent, or Firm* — JCIPRNET

(57) ABSTRACT

A multi-purpose bolt unit for fixing an object to a drilled hole formed in a soft construction structure. The multi-purpose bolt unit including: a cylindrical body inserted into the drilled hole; a front end tip formed at a lower end of the cylindrical body and having a larger outer diameter than an outer diameter of the cylindrical body; an upper thread surface formed in an upper side of the cylindrical body while spaced apart from the front end tip; an elastic packing pipe inserted into the cylindrical body and placed on the front end tip; an upper washer inserted into the cylindrical body and placed on the elastic packing pipe; a compression nut screwed to the upper thread surface and pressurizing the upper washer so that the elastic packing pipe expands; and a fastening screw groove formed inside the cylindrical body and opened upward through the compression nut.

5 Claims, 8 Drawing Sheets

(56) References Cited

U.S. PATENT DOCUMENTS

| | | | | |
|---|---|---|---|---|
| 5,568,711 A | * | 10/1996 | Popp | E01B 9/10 |
| | | | | 52/707 |
| 5,895,186 A | * | 4/1999 | Giannuzzi | F16B 13/141 |
| | | | | 411/428 |
| 2017/0247899 A1 | * | 8/2017 | Faries | E04H 12/223 |

FOREIGN PATENT DOCUMENTS

| | | |
|---|---|---|
| JP | H11140832 | 5/1999 |
| JP | 2021025276 | 2/2021 |
| KR | 1020020094351 | 12/2002 |
| KR | 200346704 | 4/2004 |
| KR | 200426760 | 9/2006 |
| KR | 1020060114777 | 11/2006 |
| KR | 1020190021626 | 3/2019 |
| KR | 102280781 | 7/2021 |
| KR | 102419254 | 7/2022 |

OTHER PUBLICATIONS

"Written Decision on Registration of Korea Counterpart Application", dated Feb. 1, 2023, with English translation thereof, p. 1-p. 6.

* cited by examiner

MULTI-PURPOSE BOLT UNIT FOR FIXING OBJECT TO DRILLED HOLE OF SOFT CONSTRUCTION STRUCTURE

CROSS-REFERENCE TO RELATED APPLICATION

This application claims the priority benefit of Korea application serial no. 10-2022-0106624, filed on Aug. 25, 2022. The entirety of the above-mentioned patent application is hereby incorporated by reference herein and made a part of this specification.

BACKGROUND

Technical Field

The present disclosure relates to a bolt unit for fixing an object to a drilled hole formed in a soft construction structure such as an asphalt road, and more particularly to a multi-purpose bolt unit for fixing an object to a drilled hole formed in a soft construction structure, the bolt unit which is capable of being easily installed and fixed in the drilled hole with watertightness and which is prevented from being separated once installed.

Description of Related Art

In general, objects such as elastic poles or parking stoppers that alert vehicles driving on roads are fixed and installed in drilled holes, which are formed by drilling a soft construction structure such as asphalt roads, using multiple anchor bolts.

For example, in the case of an elastic pole having a circular base board supported by the asphalt road surface, it is installed at the road by anchor bolts, which pass through three holes formed in the base board, to three drilled holes formed in a soft construction structure of the road. In this case, in order to fix the anchor bolts in the drilled hole, metal screws, plastic cable blocks, or anchor bolts are used.

However, in a case where an object to be fixed is a structure such as an elastic pole, when an impact is applied by a traveling vehicle, the impact is directly delivered to the anchor bolts through the drilled holes. If this impact is repeatedly applied, the gap between the drilled holes and the anchor bolts becomes loose. As a result, the structures such as the elastic pole are frequently separated from the soft construction structures such as asphalt roads.

Furthermore, in a case where an object to be fixed is a parking stopper, the anchor bolts for secure the parking stopper are often pulled out due to collisions with the wheels of vehicles. In particular, in underground parking lots, when anchor bolts are pulled out, drilled holes are exposed, leading to water leakage.

In addition, in order to fix an object to a soft construction structure, a plurality of drilled holes must be formed. However, a lot of time and efforts are required in a process of forming the multiple drilled holes or in a process of fitting and fixing anchor bolts into the drilled holes.

SUMMARY

The present disclosure provides a multi-purpose bolt unit for fixing an object to a drilled hole of a soft construction structure, so that the object is easily inserted and fixed into the drilled hole of the soft construction structure such as asphalt roads, asphalt parking lots, underground parking lots, and the like.

The present disclosure also provides a multi-purpose bolt unit for fixing an object to a drilled hole of a soft construction structure, the bot unit which is prevented from being separated once installed in the drilled hole, and which prevents water leakage through the drilled hole.

In an aspect, there is provided a multi-purpose bolt unit for fixing an object to a drilled hole formed in a soft construction structure, the multi-purpose bolt unit including: a cylindrical body inserted into the drilled hole of the soft construction structure; a front end tip formed at a lower end of the cylindrical body and having a larger outer diameter than an outer diameter of the cylindrical body; an upper thread surface formed in an upper side of the cylindrical body while spaced apart from the front end tip; an elastic packing pipe inserted into the cylindrical body and placed on the front end tip; an upper washer inserted into the cylindrical body and placed on an upper end of the elastic packing pipe; a compression nut screwed to the upper thread surface and pressurizing the upper washer so that the elastic packing pipe expands; and a fastening screw groove formed inside the cylindrical body and opened upward through the compression nut.

The multi-purpose bolt unit may further include an anchor bolt screwed into the fastening screw groove through the fixed object and the compression nut.

The multi-purpose bolt unit may further include a plurality of friction protrusions formed in an outer circumferential surface of the elastic packing pipe to increase friction with an inner circumferential surface of the drilled hole.

The compression nut may include: a nut cap screwed to the upper thread surface to be spaced apart from an upper end of the cylindrical body; a cap through-hole formed in an upper side of the nut cap to expose the fastening screw groove; and a wrench groove formed in an upper side of the nut cap, exposing the cap through-hole, and having a wrench inserted therein not to be rotatable.

An inner diameter of the cap through-hole may be larger than an inner diameter of the fastening screw groove and smaller than an inner diameter of the wrench groove.

The multi-purpose bolt unit may further include a lower washer inserted into the cylindrical body to be positioned between the front end tip and the elastic packing pipe.

An outer diameter of the front end tip may be larger than an outer diameter of the cylindrical body and smaller than an outer diameter of the lower washer, and an outer diameter of the elastic packing pipe may be larger than an outer diameter of the lower washer.

According to the present disclosure, since the front end tip formed at the lower end of the cylindrical body inserted into the drilled hole H, the upper threaded surface formed in the upper side of the cylindrical body, the lower washer, the elastic packing pipe and an upper washer inserted into the cylindrical body between the front end tip and the upper threaded surface, and the compression nut screwed to the upper threaded surface are included, it is possible for the elastic packing pipe to maintain surface contact with the inner circumferential surface of the drilled hole when the elastic packing tube is expanded laterally by rotating the compression nut. The expanded elastic packing pipe is tightly adhered to the inner circumferential surface of the drilled hole, thereby achieving perfect watertightness. In addition, the expanded elastic packing pipe has elasticity so that the expanded elastic packing pipe is not separated from the drilled hole even when vibration or repeated impact is applied from the outside.

In addition, as the fastening screw groove is provided inside the cylindrical body to be opened upward through the compression nut, it is possible to fasten and fix the anchor bolt, which passes through the object such as an elastic bar, to the fastening screw groove. Accordingly, the object E may be easily installed at the soft construction structure.

In addition, the lower washer, the upper washer, and the elastic packing pipe are inserted into the cylindrical body to be assembled, so when an inner diameter of a drilled hole to be installed is significantly larger than an inner diameter of other drilled holes, a lower washer, a upper washer, and an elastic packing pipe having relatively large outer diameters may be replaced to be inserted into and fixed to the drilled hole. Accordingly, the multi-purpose bolt unit of the present disclosure may be universally applied even if the diameter of the drilled hole vary.

DESCRIPTION OF THE EMBODIMENTS

Hereinafter, a multi-purpose bolt unit for fixing an object to a drilled hole of a soft construction structure according to the present disclosure will be described in detail with reference to the accompanying drawings.

In the description of the exemplary embodiments, it is understood that when an element is referred to as being "above" or "on" other element, the terms "above" or "on" includes both the meanings of being "directly" and "indirectly" positioned on the other element. While terms including ordinal numbers, such as "first" and "second," etc., may be used to describe various components, such components are not limited by the above terms. The above terms are used only to distinguish one component from another. The singular forms are intended to include the plural forms as well, unless the context clearly indicates otherwise. When a part is referred to as "including" an element, other elements are not excluded therefrom and may be further included unless specified otherwise. In addition, the term such as " . . . unit" or " . . . module" should be understood as a unit in which at least one function or operation is processed.

Figure 1:
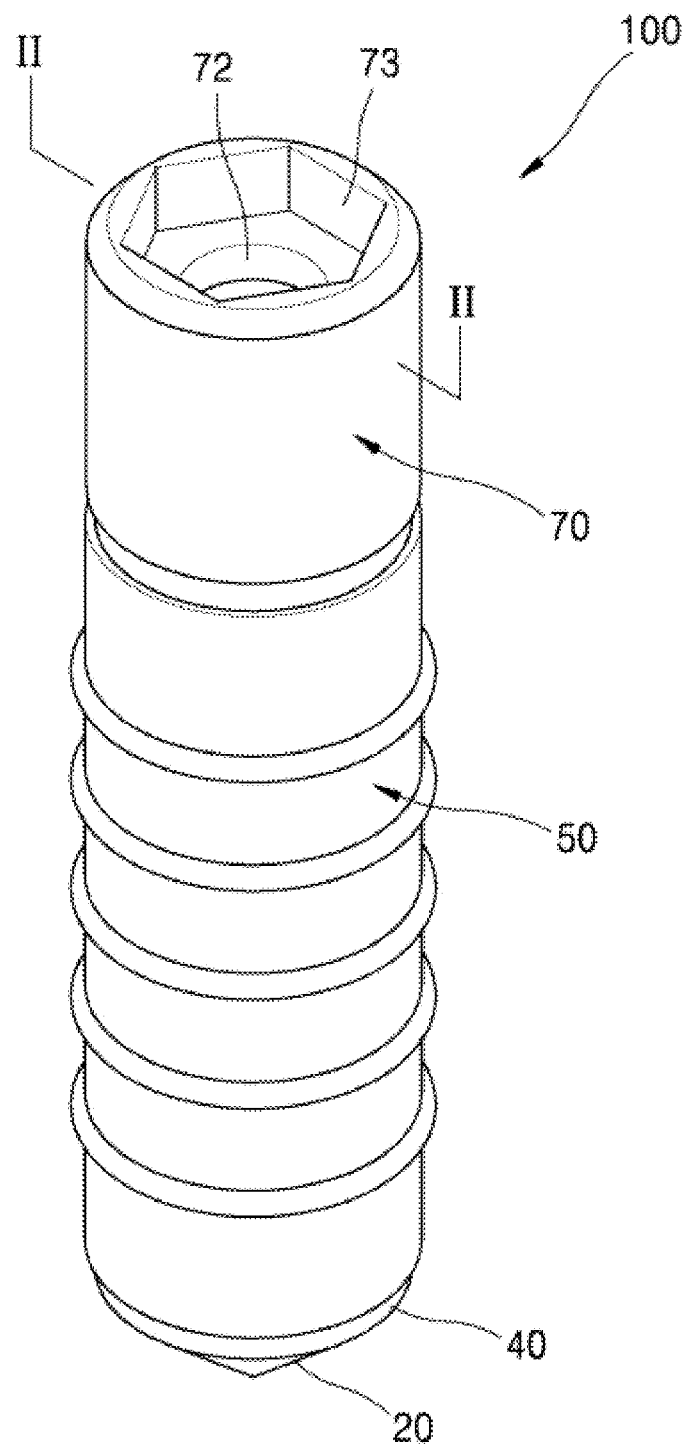
FIG. 1 is a perspective view of a multi-purpose bolt unit for fixing an object to a drilled hole of a soft construction structure according to the present disclosure.
Figure 2:
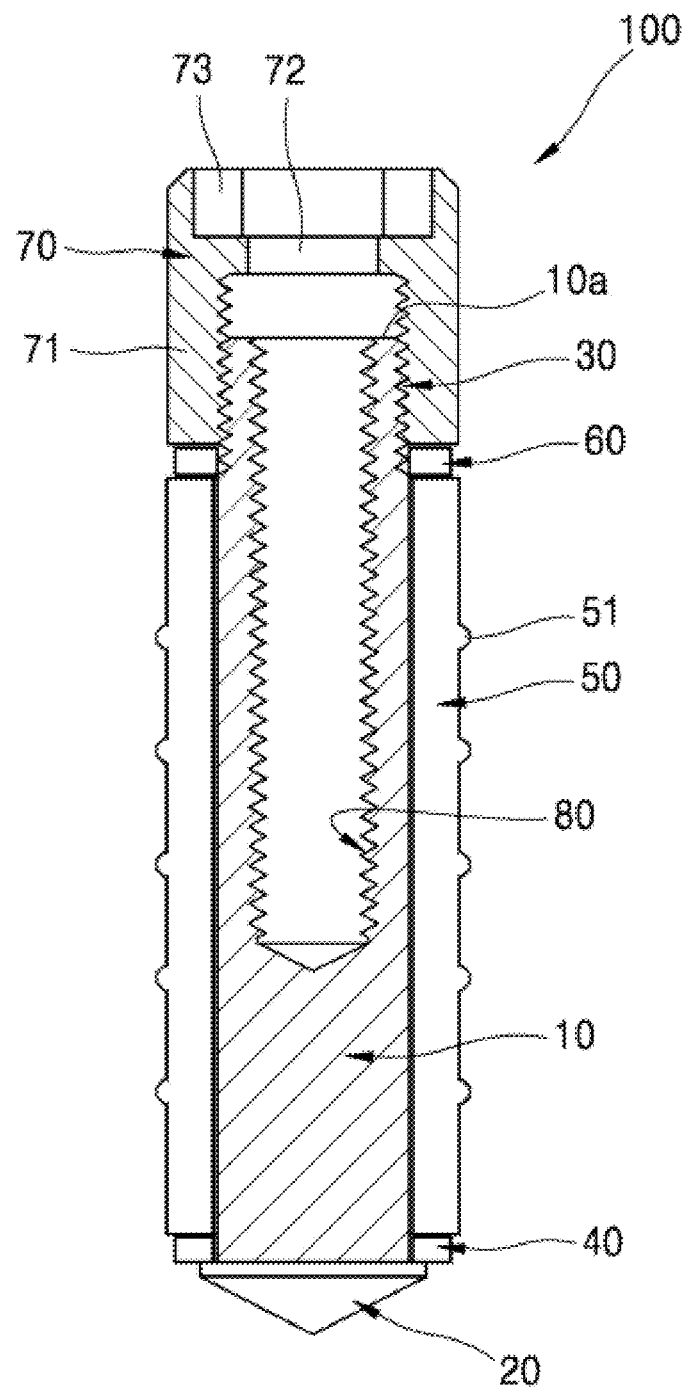
FIG. 2 is a cross-sectional view of the multi-purpose bolt unit taken along line II-II of FIG. 1.
Figure 3:
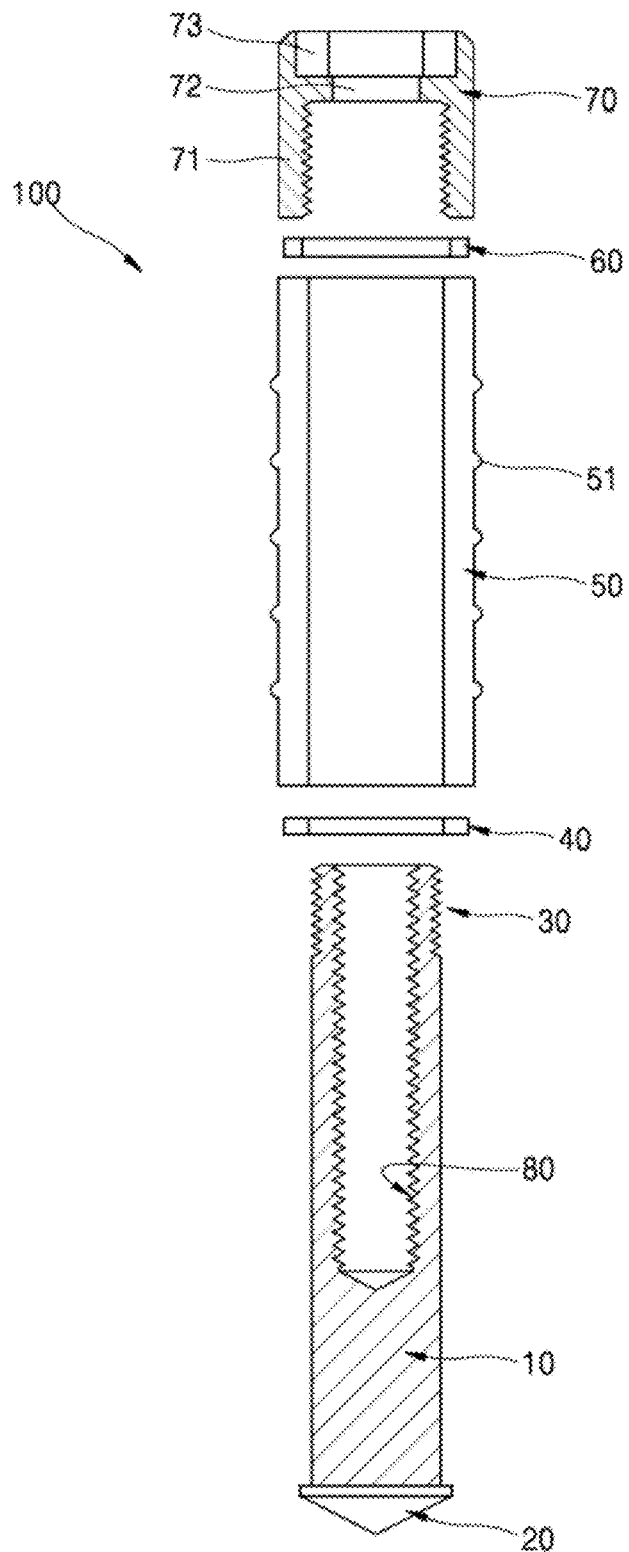
FIG. 3 is an exploded cross-sectional view of the multi-purpose bolt unit of FIG. 2.

FIG. 1 is a perspective view of a multi-purpose bolt unit for fixing an object in a drilled hole of a soft construction structure according to the present disclosure, FIG. 2 is a cross-sectional view of the multi-purpose bolt unit taken along line II-II of FIG. 1, and FIG. 3 is an exploded cross-sectional view of the multi-purpose bolt unit of FIG. 2.

As shown in the drawings, a bolt unit 100 for fixing an object to a drilled hole of a soft construction structure according to the present disclosure is used to fix an object E to be fixed, for example, an elastic pole, to a drilled hole H that is formed by perforating a soft construction structure. The bolt unit 100 includes: a cylindrical body 10 inserted into a drilled hole H of the soft construction structure; a front end tip 20 formed at a lower end of the cylindrical body 10 and having a larger outer diameter than that of the cylindrical body 10; an upper thread surface 30 formed in an upper side of the cylindrical body 10 while spaced apart from the front end tip 20; an elastic packing pipe 50 inserted into the cylindrical body 10 and placed on the front end tip 20; an upper washer 60 inserted into the cylindrical body 10 and placed on an upper end of the elastic packing pipe 50; a compression nut 70 screwed into an upper thread surface 30 and pressurizing the upper washer 60 so that the elastic packing pipe 50 expands; and a fastening screw groove 80 formed inside the cylindrical body 10 and opened upward through the compression nut 70.

There are various soft construction structures such as asphalt roads, underground parking lots, bridges, tunnels, dams, etc. In this embodiment, an asphalt road will be described as an example of the soft construction structure, and an elastic pole will be described as an example of the object E.

The drilled hole H is formed by drilling the soft construction structure and has an inner diameter of about 16 mm. The drilled hole H may be formed by a drill or the like, but may also be formed by a formwork when constructing a soft construction structure.

The cylindrical body 10, the front end 20, the upper thread surface 30, and the fastening screw groove 80 form one body, and are manufactured by performing NC processing on a cylindrical body.

The front end tip 20 has a larger outer diameter than that of the cylindrical body 10, thereby forming a step at the lower end of the cylindrical body 10. The front end tip 20 is mounted so that the elastic packing pipe 50, which will be described later, inserted into the cylindrical body 10 is not separated.

The upper thread surface 30 is formed in an upper side of the cylindrical body 10 to have the compression nut 70 screwed thereto. The upper thread surface 30 allows the compression nut 70 to move forward and backward toward the upper washer 60 when the compression nut 70 rotates forward and in reverse.

The elastic packing pipe 50 and an upper washer 60 are inserted into the cylindrical body between the front end tip 20 and the upper thread surface 30, the elastic packing pipe 50 is placed on the front end tip 20, and the upper washer 60 is placed on the elastic packing pipe 50.

Meanwhile, the bolt unit 100 may further include a lower washer 40 inserted into the cylindrical body 10 and positioned between the front end tip 20 and the elastic packing pipe 50. In this case, in a state of being placed on the front end tip 20, the lower washer 40 has the lower end of the elastic packing pipe 50 placed thereon.

The elastic packing pipe 50 is formed of a rubber material, and the lower washer 40 and the upper washer 60 respectively located underneath and on the elastic packing pipe 50 are formed of a metal material. Accordingly, the elastic packing pipe 50 is compressed when a gap between the metal lower washer 40 and the metal upper washer 60 is narrowed.

Figure 7:
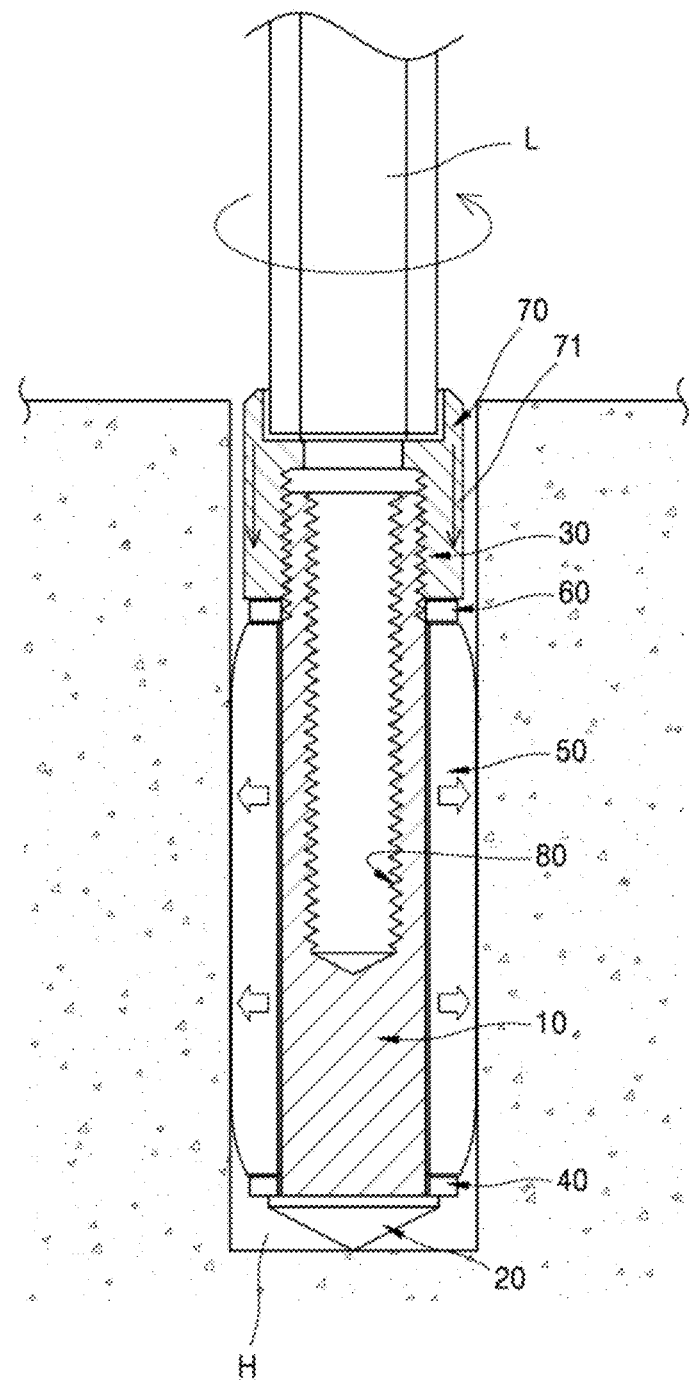

As shown in FIG. 7, when pressed by the upper washer 60, the elastic packing pipe 50 expands laterally, thereby coming into close contact with an inner circumferential surface of the drilled hole H. When strongly pressed by the upper washer 60, the elastic packing pipe 50 is elastically compressed and adheres more strongly to the inner circumferential surface of the drilled hole H. Accordingly, even if an impact is repeatedly applied to the multi-purpose bolt unit 100 of the present disclosure, the elastic packing pipe 50 may remain in surface contact with the inner circumferential surface of the drilled hole H elastically. As a result, the multi-purpose bolt unit 100 may be able to maintain a firmly fixed state.

In the outer circumferential surface of the elastic packing pipe 50, there is formed a plurality of friction protrusions 51 for increasing the friction with the inner circumferential surface of the drilled hole H when the multi-purpose bolt unit 100 of the present disclosure is inserted into the drilled hole H. Each of the plurality of friction protrusions 51 has a height of about 1 mm from the surface of the elastic packing pipe 50. Each of the plurality of friction protrusions 51 may be in the form of a protrusion protruding from the outer circumferential surface of the elastic packing pipe 50 or may be in the form of a ring. In this embodiment, five ring shapes are illustrated as the plurality of friction protrusions 51.

Figure 6:
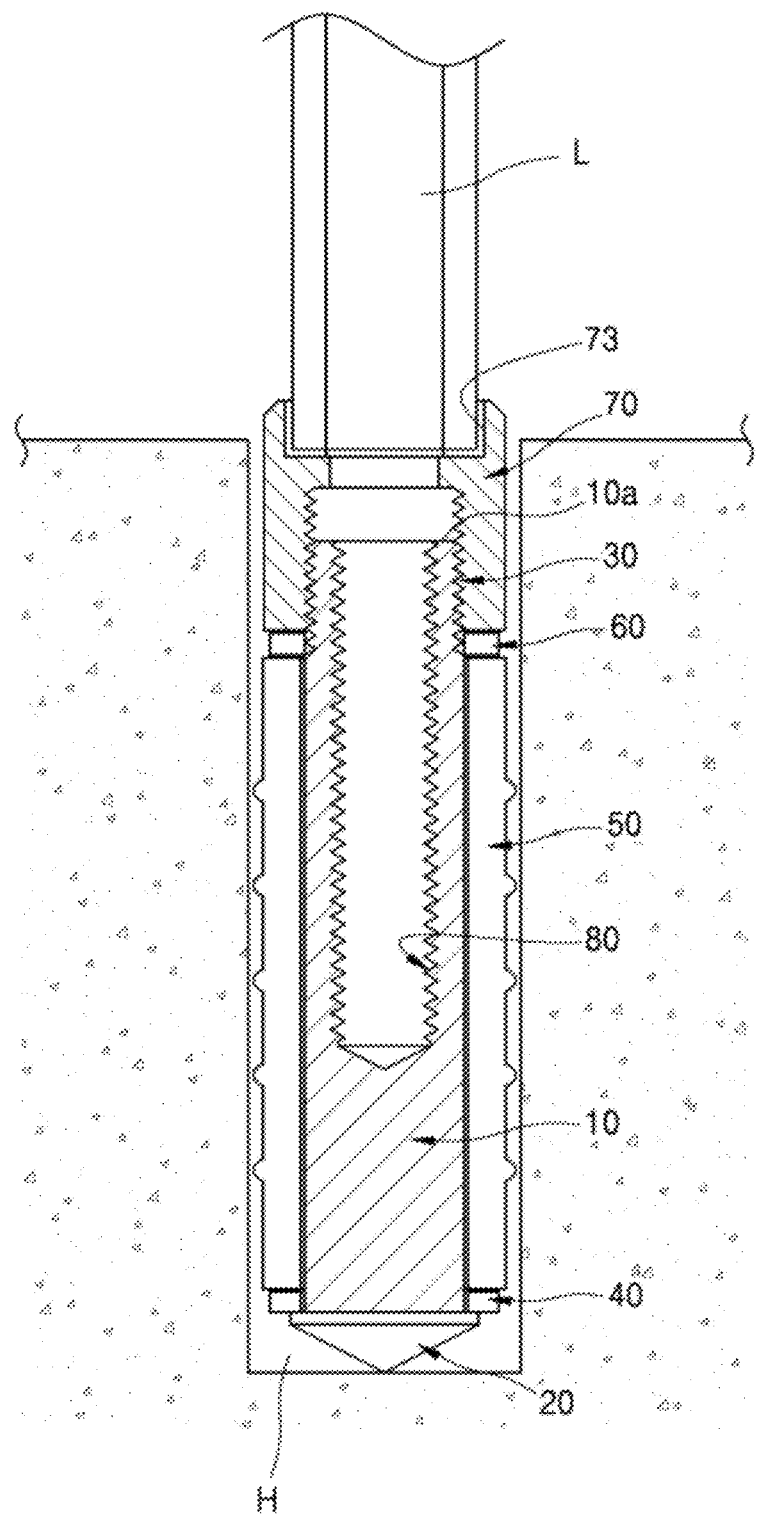

Since the plurality of friction protrusion 51 is adopted, as shown in FIG. 6, even if the inner diameter of the drilled hole H is larger than the outer diameter of the elastic packing pipe 50, the multi-purpose bolt nut 100 may be fixed directly or indirectly to the drilled hole H of the elastic packing pipe 50 so that the multi-purpose bolt nut 100 cannot be rotatable. Accordingly, the compression nut 70 may be rotated using a wrench L.

Here, since the lower washer 40, the upper washer 60, and the elastic packing pipe 50 are inserted into the cylindrical body 10 to be assembled, it is possible to replace the same with a lower washer, an upper washer, and an elastic packing pipes having different diameters. Accordingly, when an inner diameter of a drilled hole to be installed is significantly larger than an inner diameter of other drilled holes, a lower washer, an upper washer, and an elastic packing pipe having relatively large outer diameters may be replaced to be inserted into and fixed to the drilled hole. Therefore, the multi-purpose bolt unit 100 of the present disclosure may be universally applied even if the diameter of the drilled hole H vary.

The compression nut 70 is screwed to the upper thread surface 30 and presses the upper washer 60 so that the elastic packing pipe 50 expands. The compression nut 70 includes: a nut cap 71 screwed to the upper thread surface 30 to be spaced apart from an upper end 10*a* of the cylindrical body 10; a cap through-hole 72 formed in an upper side of the nut cap 71 to expose the fastening screw groove 80; and a wrench groove 73 formed in an upper side of the nut cap 71, exposing the cap through-hole 72 and having the wrench L inserted therein not to be rotatable.

The nut cap 71 is fastened to the upper thread surface 30 so as to be spaced apart from the upper end 10*a* of the cylindrical body 10, and thus, the nut cap 71 may move downward when the compression nut 70 is rotated.

The cap through-hole 72 is formed in the upper side of the nut cap 71 to provide a passage so that the anchor bolt 90 for fixing the object E can be fastened to the fastening screw groove 80.

The wrench groove 73 is open upward, and may be in the shape of a hexagonal groove so that the wrench L can be fitted not to be rotatable or may be in the shape of + so that a screwdriver type wrench can be fitted.

The anchor bolt 90 is to fix the object E, such as an elastic pole, to the drilled hole H formed in the soft construction structure. The anchor bolt 90 passes through the cap through-hole 72 of the object E and the compression nut 70 and is screwed into the fastening screw groove 80 to fix the object E.

Figure 4:
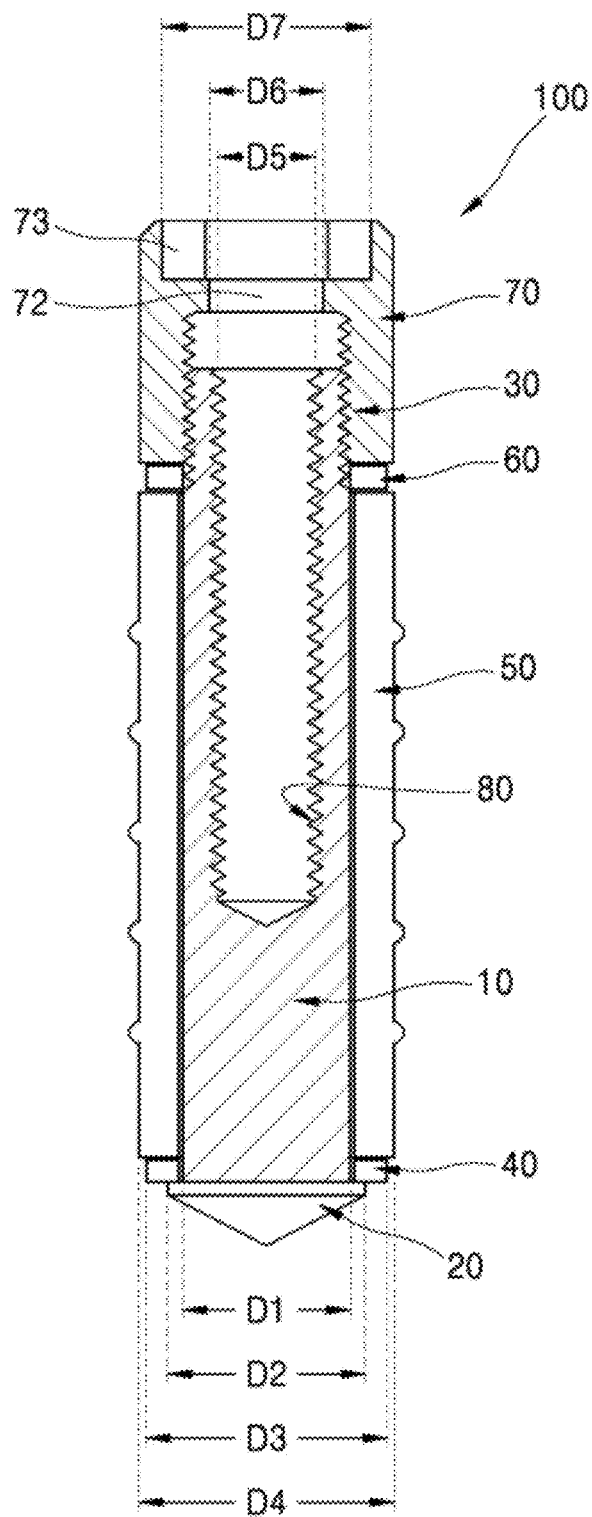
FIG. 4 is a cross-sectional view for explaining relative diameters of a cylindrical body, a front end tip, a lower washer, an upper washer, an elastic packing pipe, and a cap through-hole in the multi-purpose bolt unit of FIG. 2.

FIG. 4 is a cross-sectional view for explaining the relative diameters of the cylindrical body, the front end, the lower washer, the upper washer, the elastic packing pipe and the cap through-hole in the multi-purpose bolt unit of FIG. 2.

An outer diameter D2 of the front end tip 20 is larger than an outer diameter D1 of the cylindrical body 10 and smaller than an outer diameter D3 of the lower washer 40, and an outer diameter D4 of the elastic packing pipe 50 is larger than the outer diameter D3 of the lower washer 40. That is, it can be expressed as follows: the outer diameter D4 of the elastic packing tube 50>the outer diameter of the lower washer 40>the outer diameter D2 of the front end tip>the outer diameter D1 of the cylindrical body 10.

Accordingly, the elastic packing pipe 50, whose diameter is significantly larger than the outer diameter D2 of the front end tip 20, may be placed on the front end tip 20 by use of the lower washer 40 so that the elastic packing pipe 50 is not separated from the front end tip 20, and when the elastic packing tube 50 is inserted into the drilled hole H, the inner circumferential surface of the drilled hole H does not come into contact with the lower washer 40.

The front end tip 20 integrally formed with the cylindrical body 10 is formed by cutting an outer circumferential surface of the cylindrical body. At this point, when forming the front end tip 20 with a significantly larger outer diameter than the outer diameter D1 of the cylindrical parent material 10, the remaining portion except for the front end tip must be cut using a cylindrical body with a large outer diameter. In this process, a lot of processing effort and cost is required, thereby reducing productivity. Therefore, in order to increase the productivity, it is advantageous if the outer diameter D2 of the front end tip 20 is not excessively large compared to the cylindrical body 10. However, when the outer diameter of the elastic packing pipe 50 is significantly larger than the outer diameter D2 of the front end tip 20, the elastic packing pipe 50 may be separated from the front end tip 20.

For this reason, the present disclosure employs the lower washer 40 larger whose outer diameter is larger than the outer diameter D2 of the front end tip 20. Accordingly, although the outer diameter D4 of the elastic packing pipe 50 is significantly larger than the outer diameter D2 of the lower washer 40, it is possible to place the elastic packing pipe 50 on the front end tip 20 by use of the lower washer 40.

In addition, since the outer diameter D4 of the elastic packing pipe 50 is smaller than the outer diameter D3 of the lower washer 40, it is possible to prevent that the lower washer 40 formed of a metal material damages the inner circumferential surface of the drilled hole H in a process in which the elastic packing pipe 50 is fitted to the drilled hole H.

In addition, an inner diameter D6 of the cap through-hole 72 of the compression nut 70 is greater than an inner diameter D5 of the fastening screw groove 80 and smaller than an inner diameter D7 of the wrench groove 73. Accordingly, a function of inserting the wrench L into the wrench groove 73 to rotate the compression nut 70, and a function of fastening the anchor bolt 90, which is for fixing the object E, to the fastening screw groove 80 through the cap through-hole 72 may be implemented.

Figure 5:
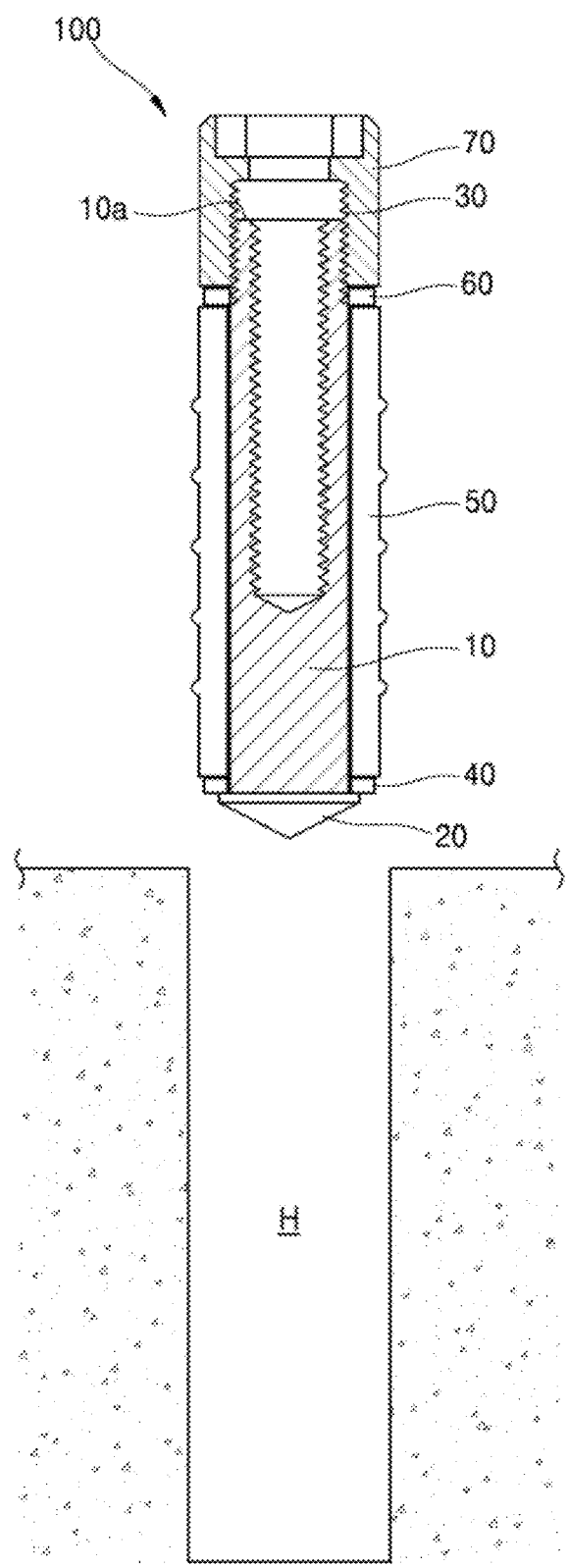
FIGS. 5 to 7 are views for explaining a process of fitting and fixing the multi-purpose bolt unit of FIG. 1 to a drilled hole.

FIGS. 5 to 7 are views for explaining a process of inserting and fix the multi-purpose bolt unit of FIG. 1 into a drilled hole.

In order to insert and fix the multi-purpose bolt unit 100 of the present disclosure into the drilled hole H of the soft construction structure, the multi-purpose bolt unit 100 is first inserted into the upper side of the drilled hole H.

Next, as shown in FIG. 6, the wrench L is fitted into the wrench groove 73 of the compression nut 70, and the compression nut 70 is rotated using the wrench L so that a lower end of the nut cap 71 presses the upper washer 60 downward.

Then, as shown in FIG. 7, the pressurized upper washer 60 compresses the elastic packing pipe 50 while moving downward, and the compressed elastic packing pipe 50 expands outward to come into close contact with the inner circumferential surface of the drilled hole H. At this point, since the elastic packing pipe 50 comes into close contact with the inner circumferential surface of the drilled hole H, the elastic packing pipe 50 may be able to remain in surface contact even an impact is applied repeatedly. Thus, the elastic packing pipe 50 may maintain a strongly fixed state.

Figure 8:
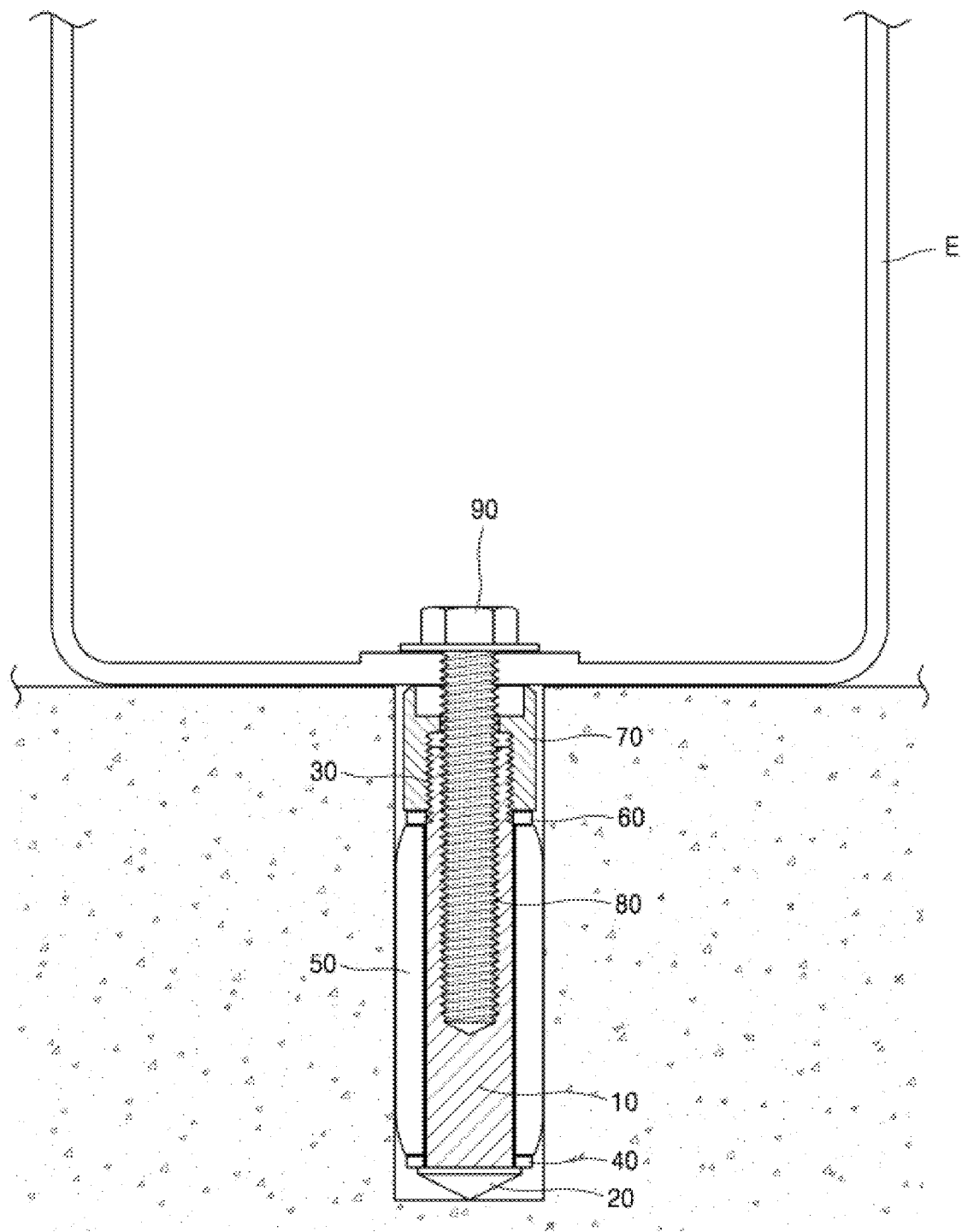
FIG. 8 is a view for explaining that an object is fixed by the multi-purpose bolt unit of FIG. 7.

FIG. 8 is a view for explaining that an object is fixed by the multi-purpose bolt unit of FIG. 7.

In order to fix the object E, such as an elastic pole, to the multi-purpose bolt unit 100, the object E is placed on the multi-purpose bolt unit 100 that is fixed to the drilled hole H of the soft construction structure. Then, when the anchor bolt 90 penetrating the object E passes through the cap through-hole 72 and is screwed to the fastening screw groove 80, the object E is fixed to the multi-purpose bolt unit 100.

As described above, according to the present disclosure, since the front end tip 20 formed at the lower end of the cylindrical body 10 inserted into the drilled hole H, the upper threaded surface 30 formed in the upper side of the cylindrical body 10, the lower washer 40, the elastic packing pipe 50 and an upper washer 60 inserted into the cylindrical body 10 between the front end tip 20 and the upper threaded surface 30, and the compression nut 70 screwed to the upper threaded surface 30 are included, the elastic packing pipe 50 may be able to maintain surface contact with the inner circumferential surface of the drilled hole H when the elastic packing tube 50 is expanded laterally by rotating the compression nut 70. The expanded elastic packing pipe 50 is tightly adhered to the inner circumferential surface of the drilled hole H, thereby achieving perfect watertightness. In addition, the expanded elastic packing pipe 50 has elasticity so that the expanded elastic packing pipe 50 is not separated from the drilled hole H even when vibration or repeated impact is applied from the outside. That is, the multi-purpose bolt unit 100 may maintain a solidly fixed state in the drilled hole H in response to any vibration or impact applied from the outside.

In addition, due to the fastening screw groove 80 is provided inside the cylindrical body to be opened upward through the compression nut 70, it is possible to fasten and fix the anchor bolt 90, which passes through the object E such as an elastic bar, to the fastening screw groove 80. Accordingly, the object E may be easily installed at the soft construction structure.

In addition, the lower washer 40, the upper washer 60, and the elastic packing pipe 50 are inserted into the cylindrical body 10 to be assembled, so when an inner diameter of a drilled hole to be installed is significantly larger than an inner diameter of other drilled holes, a lower washer, an upper washer, and an elastic packing pipe having relatively large outer diameters may be replaced to be inserted into and fixed to the drilled hole. Accordingly, the multi-purpose bolt unit 100 of the present disclosure may be universally applied even if the diameter of the drilled hole H vary.

Although the present disclosure has been described with reference to the embodiment illustrated in the drawings, the embodiment is merely illustrative, and those skilled in the art would appreciate that various modifications and other equivalent embodiments are possible.

What is claimed is:

1. A multi-purpose bolt unit for fixing an object to a drilled hole formed in a soft construction structure, the multi-purpose bolt unit comprising:
 a cylindrical body inserted into the drilled hole of the soft construction structure;
 a front end tip formed at a lower end of the cylindrical body and having a larger outer diameter than an outer diameter of the cylindrical body;
 an upper thread surface formed in an upper side of the cylindrical body while spaced apart from the front end tip;
 an elastic packing pipe inserted into the cylindrical body and placed on the front end tip;
 an upper washer inserted into the cylindrical body and placed on an upper end of the elastic packing pipe;
 a compression nut screwed to the upper thread surface and pressurizing the upper washer so that the elastic packing pipe expands; and
 a fastening screw groove formed inside the cylindrical body and opened upward through the compression nut,
 wherein the compression nut comprises:
  a nut cap screwed to the upper thread surface to be spaced apart from an upper end of the cylindrical body;
  a cap through-hole formed in an upper side of the nut cap to expose the fastening screw groove; and
  a wrench groove formed in an upper side of the nut cap, exposing the cap through-hole, and having a wrench inserted therein not to be rotatable,
 wherein an inner diameter of the cap through-hole is larger than an inner diameter of the fastening screw groove and smaller than an inner diameter of the wrench groove.

2. The multi-purpose bolt unit of claim 1, further comprising:
 an anchor bolt screwed into the fastening screw groove through the object and the compression nut.

3. The multi-purpose bolt unit of claim 1, further comprising:
 a plurality of friction protrusions formed in an outer circumferential surface of the elastic packing pipe to increase friction with an inner circumferential surface of the drilled hole.

4. The multi-purpose bolt unit of claim 1, further comprising:
 a lower washer inserted into the cylindrical body to be positioned between the front end tip and the elastic packing pipe.

5. The multi-purpose bolt unit of claim 4, wherein an outer diameter of the front end tip is larger than an outer diameter of the cylindrical body and smaller than an outer diameter of the lower washer, and an outer diameter of the elastic packing pipe is larger than an outer diameter of the lower washer.

\* \* \* \* \*